(12) United States Patent
Lin et al.

(10) Patent No.: US 12,045,148 B2
(45) Date of Patent: Jul. 23, 2024

(54) VERIFICATION SYSTEM OF BASIC INPUT OUTPUT SYSTEM AND VERIFICATION METHOD THEREOF

(71) Applicants: Cheng-Hung Lin, Taipei (TW); Chang-Yu Tu, Taipei (TW); Wen-Shyan Lai, Taipei (TW)

(72) Inventors: Cheng-Hung Lin, Taipei (TW); Chang-Yu Tu, Taipei (TW); Wen-Shyan Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/964,942

(22) Filed: Oct. 13, 2022

(65) Prior Publication Data
US 2023/0359536 A1  Nov. 9, 2023

(30) Foreign Application Priority Data

May 5, 2022 (TW) ................................. 111116902

(51) Int. Cl.
*G06F 11/22* (2006.01)

(52) U.S. Cl.
CPC ...... *G06F 11/2284* (2013.01); *G06F 11/2268* (2013.01)

(58) Field of Classification Search
CPC .......................... G06F 11/2284; G06F 11/2268
See application file for complete search history.

(56) References Cited

U.S. PATENT DOCUMENTS

| 8,719,637 B2 * | 5/2014 | Gao ................... G06F 11/2284 714/36 |
| 11,354,210 B2 * | 6/2022 | Chang ................ G06F 11/2284 |
| 2020/0301796 A1 | 9/2020 | Hu |

FOREIGN PATENT DOCUMENTS

| TW | 201007446 | 2/2010 |
| TW | 201109972 | 3/2011 |
| TW | 201137603 | 11/2011 |
| TW | I571736 | 2/2017 |

OTHER PUBLICATIONS

"Office Action of Taiwan Counterpart Application", issued on Aug. 30, 2022, p. 1-p. 5.

* cited by examiner

*Primary Examiner* — Nadeem Iqbal
(74) *Attorney, Agent, or Firm* — JCIPRNET

(57) ABSTRACT

A verification system of a basic input output system and a verification method thereof are provided. The verification system includes a server, a microcontroller, and a verification device. The server includes a platform controller hub and the basic input output system. The server outputs a log file of the basic input output system by a system management bus controller in the platform controller hub. The microcontroller is coupled to the server. The microcontroller receives the log file and converts the log file into a readable character. The verification device is coupled to the microcontroller. The verification device receives and displays the readable character.

14 Claims, 4 Drawing Sheets

VERIFICATION SYSTEM OF BASIC INPUT OUTPUT SYSTEM AND VERIFICATION METHOD THEREOF

CROSS-REFERENCE TO RELATED APPLICATION

This application claims the priority benefit of Taiwanese application no. 111116902, filed on May 5, 2022. The entirety of the above-mentioned patent application is hereby incorporated by reference herein and made a part of this specification.

BACKGROUND

Technical Field

The disclosure relates to a verification system. In particular, the disclosure relates to a verification system of a basic input output system and a verification method thereof.

Description of Related Art

When a server is turned on, a basic input output system (BIOS) thereof is started to perform a power-on self-test (POST). When testers perform tests on the server, it is required to verify whether a BIOS code is correct or not by reading data obtained from the POST. However, in the convention, a motherboard of the server is required to be coupled to a personal computer through a dedicated debug kit or a board management controller (BMC) provided by the original factory for verification, in which the cost is relatively high and self service repair is unlikely. In addition, the motherboard of the server is required to be designed with a great number of pins to facilitate coupling with the dedicated debug kit, and setting of the dedicated debug software for verification is relatively complicated.

SUMMARY

The disclosure provides a verification system of a basic input output system and a verification method thereof, in which a log file of a BIOS for a power-on self-test in a server is read by a general-purpose microcontroller, the log file is converted into a readable character, and the readable character is displayed on a verification device.

An embodiment of the disclosure provides a verification system of a basic input output system. The verification system includes but is not limited to a server, a microcontroller, and a verification device. The server includes a platform controller hub and the basic input output system. The server outputs a log file of the basic input output system by a system management bus controller in the platform controller hub. The microcontroller is coupled to the server. The microcontroller is configured to receive the log file and convert the log file into a readable character. The verification device is coupled to the microcontroller. The verification device receives and displays the readable character.

An embodiment of the disclosure provides a verification method of a basic input output system. The verification method includes but is not limited to the following. A log file of the basic input output system is output by a system management bus controller in a platform controller hub of a server. The log file is received and converted into a readable character by a microcontroller. The readable character is received and displayed by a verification device.

Based on the foregoing, in some embodiments of the disclosure, the server transfers the log file of the basic input output system to the microcontroller by the system management bus, the microcontroller converts the log file of the basic input output system into the readable character, and transfers the readable character to the verification device to display the readable character, for testers to analyze and verify the code of the basic input output system. Since a general-purpose microcontroller alone is required without a dedicated debug kit and a board management controller, the cost can be reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
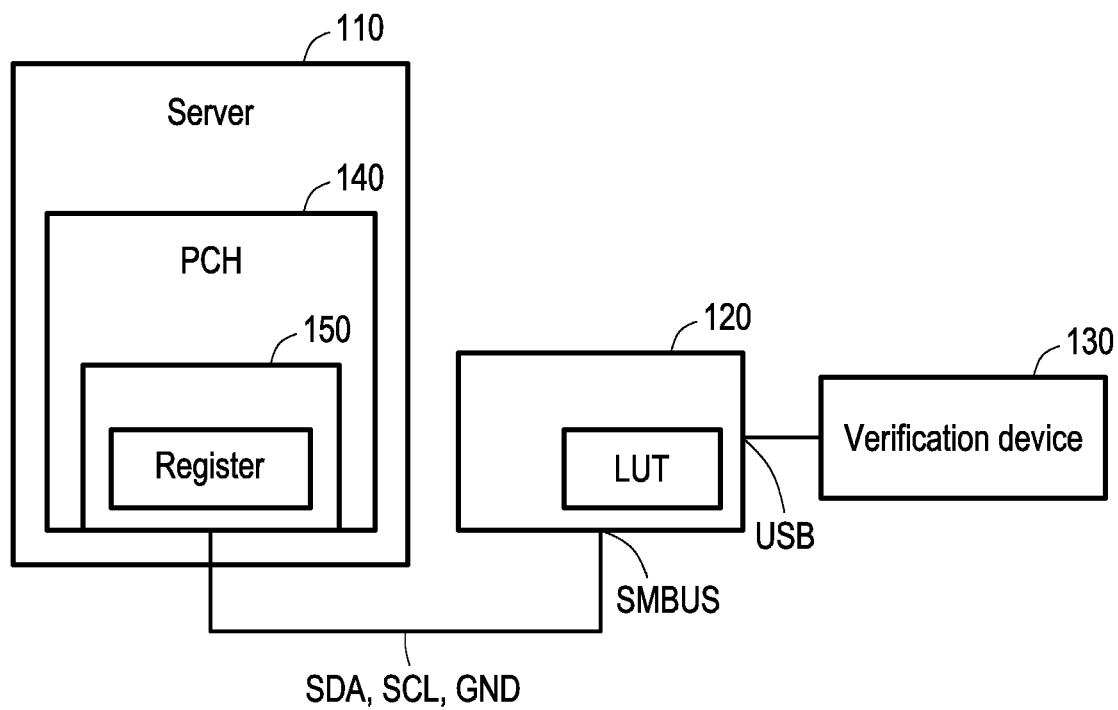
FIG. 1 is a block diagram of a verification system of a basic input output system according to an embodiment of the disclosure.

The term "couple (or connect)" used throughout the whole description of the disclosure (including the claims) may refer to any direct or indirect connection means. For example, if the disclosure describes that a first device is coupled (or connected) to a second device, it should be interpreted that the first device may be directly connected to the second device, or that the first device may be indirectly connected to the second device through other devices or certain connection means. Moreover, wherever possible, elements/members/steps with the same reference numerals in the drawings and the embodiments denote the same or similar parts. Cross-reference may be made to related descriptions of elements/members/steps with the same reference numerals or the same terms in different embodiments.

Figure 2:
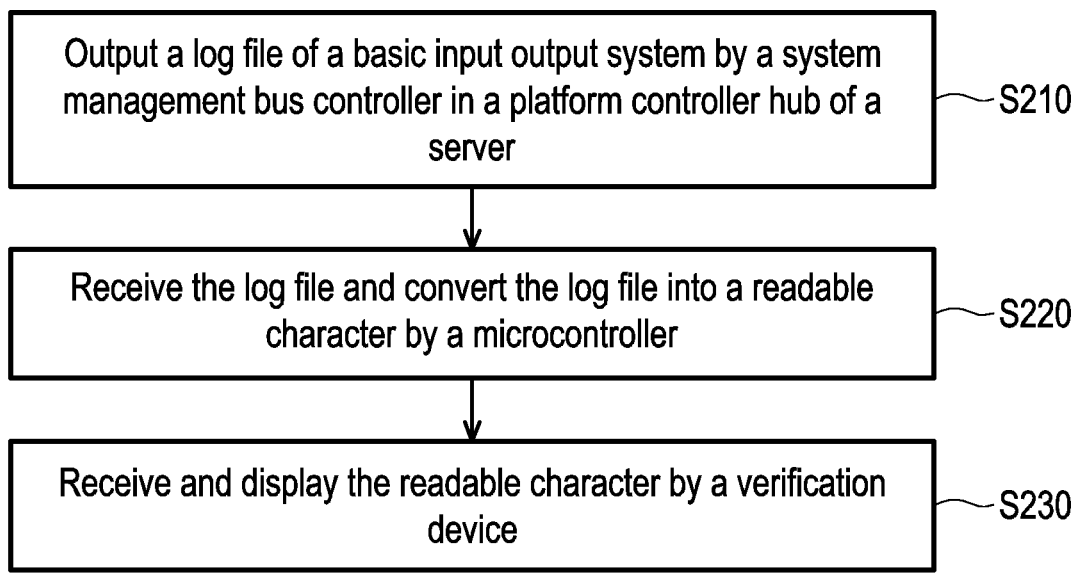
FIG. 2 is a flowchart of a verification method of a basic input output system according to an embodiment of the disclosure.

FIG. 1 is a block diagram of a verification system of a basic input output system according to an embodiment of the disclosure. FIG. 2 is a flowchart of a verification method of a basic input output system according to an embodiment of the disclosure. With reference to FIG. 1 and FIG. 2, a verification system 10 includes but is not limited to a server 110, a microcontroller 120, and a verification device 130. The microcontroller 120 is coupled between the server 110 and the verification device 130. In an embodiment of the disclosure, the verification system 10 may read a log file of a basic input output system (BIOS), namely a test result of the BIOS performing a power-on self-test (POST), in the server 110, and convert the log file into a readable character by the microcontroller 120. In addition, the verification system 10 may display the readable character by the verification device 130 for testers to verify a BIOS code of the server 110. For example, the readable character is a character, such as an English alphabet, a digit, or the like, readable and understandable to testers.

In an embodiment, the server 110 may be a network host, for example. The server 110 includes a platform controller hub (PCH) 140 and the BIOS. The platform controller hub 140 is configured to consolidate and distribute various I/O functions in the server 110. The platform controller hub 140 in the server 110 includes a system management bus (SMBus) controller 150. The system management bus controller 150 is configured to control data transfer of the system management bus SMBus. The system management bus SMBus is a two-wire bus for lightweight communication (carrying frequencies, data, and commands) on a motherboard. The system management bus SMBus has at least a data line SDA, a clock line SCL, and a ground line GND among other connection lines. The server 110 transfers the log file of the BIOS to the microcontroller 120 through the data line SDA and the clock line SCL in the system management bus SMBus.

The microcontroller 120 is a microcontroller unit (MCU), for example, and is a self-powered integrated device including a central processing unit (CPU), memory, a counter, and various input and output interfaces. The microcontroller 120 is coupled to the system management bus controller 150 in the server 110 by the data line SDA, the clock line SCL, the ground line GND, and the like. The microcontroller 120 further includes a universal serial bus (USB) configured to transfer data to the verification device 130.

The verification device 130 may include a personal computer with a universal serial bus and a display device (not shown). The verification device 130 is configured to be coupled to the microcontroller 120 and receive data through the universal serial bus, and display data through the display device.

With reference to FIG. 2, in step S210, the verification system 10 outputs a log file of a basic input output system BIOS by the system management bus controller 150 in the platform controller hub 140 of the server 110. Specifically, the server 110 includes the platform controller hub 140 and the basic input output system BIOS. The platform controller hub 140 includes the system management bus controller 150. The system management bus controller 150 is coupled to the microcontroller 120 through the data line SDA, the clock line SCL, and the ground line GND. The server 110 may control the system management bus SMBUS by the system management bus controller 150 in the platform controller hub 140 to output the log file of the basic input output system BIOS. The log file of the basic input output system BIOS includes a plurality of test results of the BIOS performing a power-on self-test (POST). The system management bus controller 150 sequentially transfers the plurality of test results according to the data specification of the system management bus SMBUS. The transfer of the log file of the basic input output system BIOS by the server 110 to the microcontroller 120 will be described in detail in FIG. 3.

Next, in step S220, the verification system 10 receives the log file of the basic input output system BIOS and converts the log file into a readable character by the microcontroller 120. In an embodiment, the microcontroller 120 includes a system management bus SMBUS and a universal serial bus USB. The microcontroller 120 receives the log file of the basic input output system BIOS from the server 110 by the system management bus SMBUS, and converts the log file of the basic input output system BIOS, which is sequentially transferred according to the data specification of the system management bus SMBUS, into a readable character. The conversion of the log file into a readable character will be described in detail in FIG. 4. In step S230, the verification system 10 receives the readable character from the microcontroller 120 by the verification device 130, and displays the readable character through a verification program. The verification program may be third party software, such as PuTTY, configured to display a readable character, and the disclosure is not limited thereto. The conversion of the log file into a readable character and the transfer of the readable character will be described in detail in FIG. 4.

Figure 3:
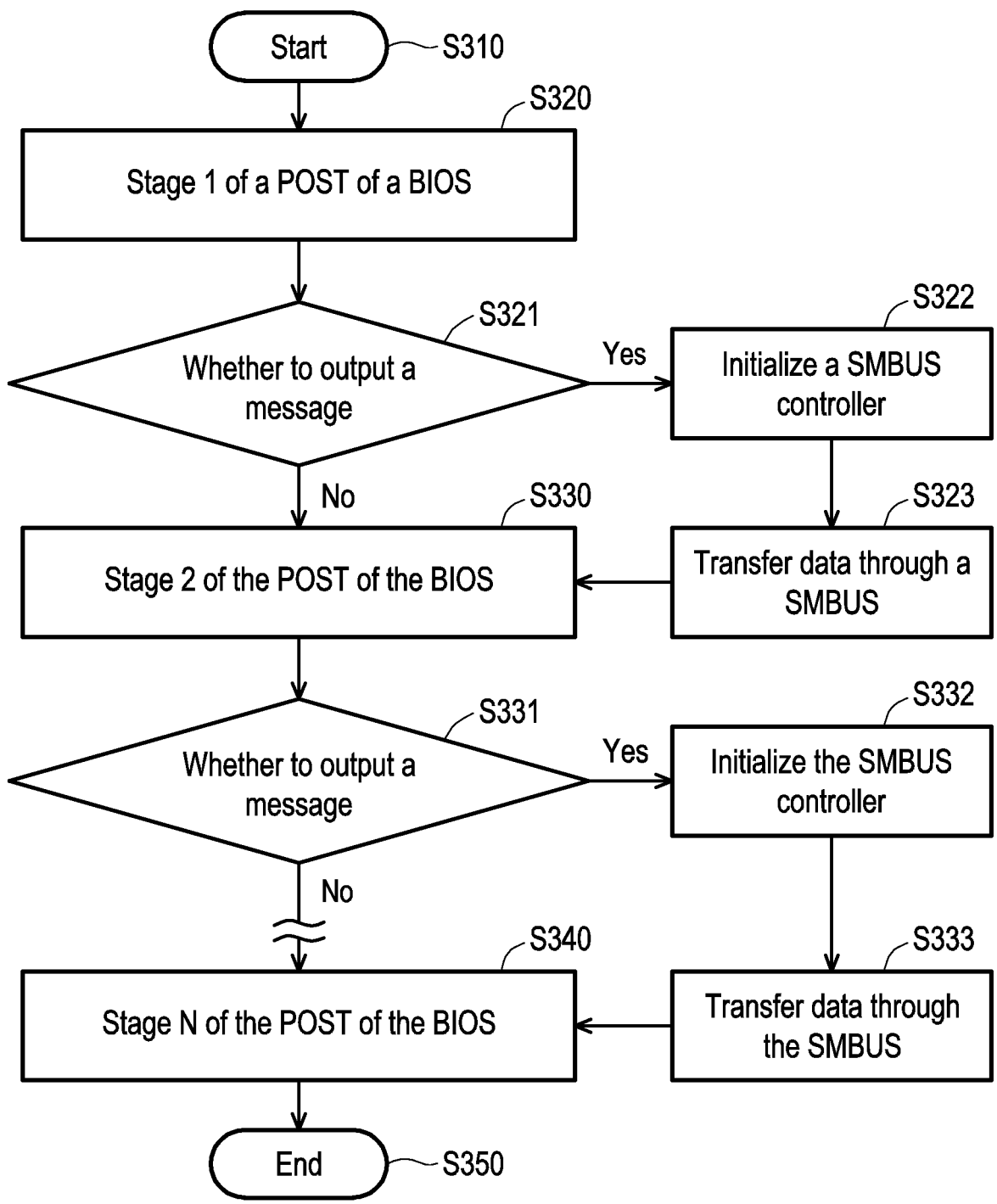
FIG. 3 is a flowchart of a server transferring a log file of a basic input output system to a microcontroller according to an embodiment of the disclosure.

FIG. 3 is a flowchart of a server transferring a log file of a basic input output system to a microcontroller according to an embodiment of the disclosure. With reference to FIG. 3, in step 310, the server 110 starts the process flows. Next, in step S320, a BIOS of the server 110 performs a stage 1 of a power-on self-test (POST) to generate a log file of the stage 1 of the POST of the BIOS, namely a test result of the stage 1 of the POST of the BIOS. To be specific, the POST of the BIOS is, for example, sequentially testing the processor, the BIOS, the system clock, the memory, the display card, and the like. Therefore, the POST of the BIOS may be divided into N stages, including the stage 1 of the POST of the BIOS, a stage 2 of the POST of the BIOS, . . . , and a stage N of the POST of the BIOS, according to the test sequence. In the disclosure, the number of N is not limited.

In step S321, after the stage 1 of the POST of the BIOS is completed, the server 110 determines whether to output the log file of the stage 1 of the POST of the BIOS according to a BIOS code. If yes, the flow enters step S322; if not, the flow enters step S330. Specifically, there is a determination formula for whether to output the log file in the stage 1 to the stage N of the POST of the BIOS. Testers may pre-program the determination basis for whether to output the log file in the stage 1 to the stage N−1 of the POST of the BIOS, for example, the log file is to be output in the stage 1 of the POST of the BIOS, the log file is not to be output in the stage 2 of the POST of the BIOS, and so on, depending on the design requirements, to optionally output the log files of the stage 1 to the stage N−1 of the POST of the BIOS (the test results of the POST of the BIOS).

Next, in step S322, the BIOS initializes the system management bus controller 150 to clear data in a register (not shown) in the system management bus controller 150, and inputs the log file content of the stage 1 of the POST of the BIOS to the register in the system management bus controller 150 according to the data specification of the system management bus SMBUS. In step S323, the log file of the stage 1 of the POST of the BIOS with the data specification of the system management bus SMBUS in the register is transferred to the microcontroller 120 through the data line SDA and the clock line SCL in the system management bus SMBUS.

In step S330, the BIOS of the server 110 performs the stage 2 of the POST to generate a log file of the stage 2 of the POST of the BIOS. Next, in step S331, after the stage 2 of the POST of the BIOS is completed, the server 110 determines whether to output the log file of the stage 2 of the POST of the BIOS according to the BIOS code. If yes, the flow enters step S332; if not, the flow enters the stage 3 (not shown) of the POST of the BIOS, and so on.

In step S332, the BIOS initializes the system management bus controller 150 to clear data in the register in the system management bus controller 150, and inputs the log file content of the stage 2 of the POST of the BIOS to the register in the system management bus controller 150 according to the data specification of the system management bus SMBUS. In step S333, the log file of the stage 2 of the POST of the BIOS with the data specification of the system management bus SMBUS in the register is transferred to the microcontroller 120 through the data line SDA and the clock line SCL in the system management bus SMBUS.

In step S340, the BIOS of the server 110 performs the stage N of the POST to generate a log file of the stage N of the POST of the BIOS. In this embodiment, in the stage N of the POST of the BIOS, it is predetermined not to output the log file. In other embodiments, in the stage N of the POST of the BIOS, it is also possible to determine whether to output the log file, initialize the system management bus controller 150, and transfer the log file through the system management bus SMBUS as in the stage 1 to the stage N−1 of the POST of the BIOS, which will not be repeatedly described here. In step S350, the server 110 ends the transfer process of the log file of the BIOS.

Figure 4:
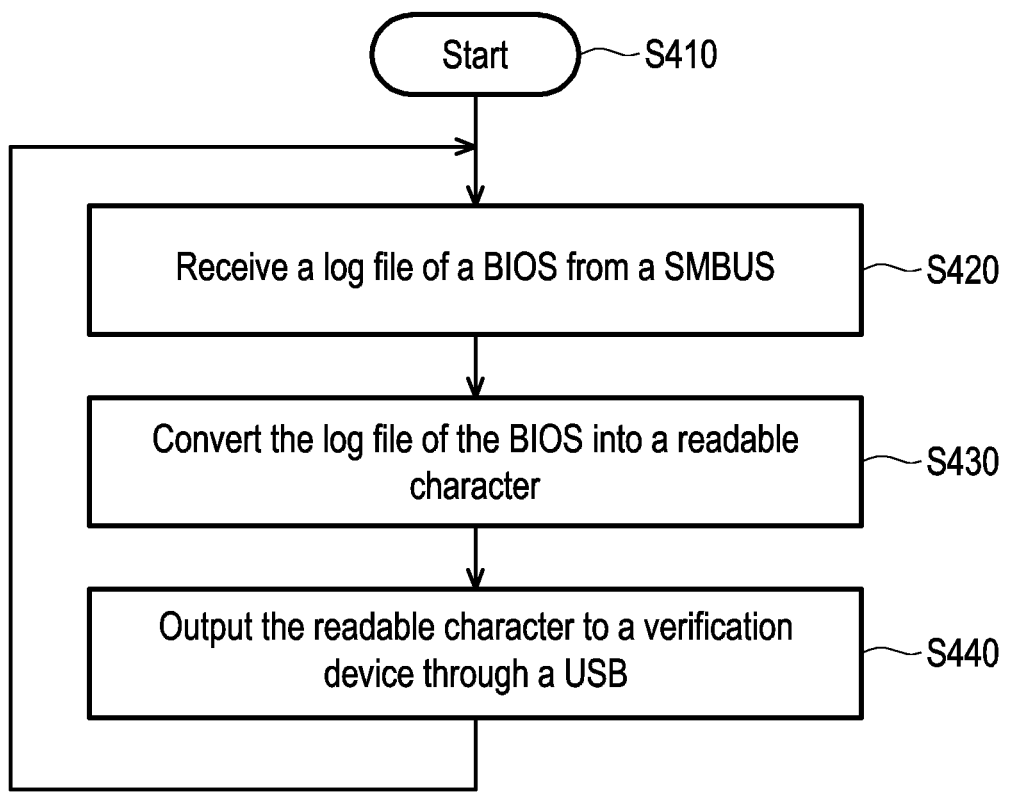
FIG. 4 is a flowchart of a microcontroller transferring a readable character to a verification device according to an embodiment of the disclosure.

FIG. 4 is a flowchart of a microcontroller transferring a readable character to a verification device according to an embodiment of the disclosure. With reference to FIG. 4, in step S410, the microcontroller 120 starts the transfer process. In step S420, the microcontroller 120 receives a log file of a stage 1 of a POST of a BIOS from the server 110 and through the system management bus SMBUS. For the specifics, reference may be made to the description above, which will not be repeated. In step S430, the microcontroller 120 converts the log file of the stage 1 of the POST of the BIOS into a readable character. Specifically, the microcontroller 120 may input the log file of the BIOS to a lookup table to generate the readable character. The lookup table includes a correspondence between binary data compliant with the specification of the system management bus SMBUS in the log file and the readable character. For example, binary data 00000100 in the log file of the BIOS corresponds to a readable character 4, and the microcontroller 120 may convert the binary data in the log file of the stage 1 of the POST of the BIOS into a readable character, such as an English alphabet or a digit, readable and understandable to testers based on the lookup table. Next, in step S440, the microcontroller 120 outputs the readable character to the verification device 130 through the universal serial bus USB. Next, the flow returns to step S420, in which the microcontroller 120 receives a log file of a stage 2 of the POST of the BIOS from the server 110 through the system management bus SMBUS, and so on.

In summary of the foregoing, in the disclosure, the microcontroller including the system management bus SMBUS is coupled to the system management bus controller of the platform controller hub PCH in the server, the log file of the BIOS is transferred by the system management bus SMBUS to the microcontroller to be converted into a readable character, and the readable character is transferred to the verification device through the universal serial bus USB. Since a general-purpose microcontroller that includes the system management bus SMBUS and the universal serial bus USB alone is required without a dedicated debug kit and a board management controller, the cost can be reduced. On the other hand, the motherboard of the server may be designed with a low number of pins, and the verification device only requires to display the readable character using third party software, so the setting is simple.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A verification system of a basic input output system, the verification system comprising:
    a server comprising a platform controller hub and the basic input output system, the server configured to determine whether to output at least one of a plurality of stage log files of a plurality of self-test stage in a log file of the basic input output system according to a code of the basic input output system by a system management bus controller in the platform controller hub, wherein when a first stage log file among the plurality of stage log files is to be output, the system management bus controller clears data in a register in the system management bus controller and inputs the first stage log file into the register;
    a microcontroller coupled to the server, and configured to receive the first stage log file and convert the first stage log file into a readable character; and
    a verification device coupled to the microcontroller, the verification device configured to receive and display the readable character.

2. The verification system according to claim 1, wherein the basic input output system initializes the system management bus controller before the server outputs the log file, and the system management bus controller is configured to control a system management bus.

3. The verification system according to claim 2, wherein the server transfers the log file by a data line and a clock line in the system management bus, and the log file is a test result of the basic input output system performing a power-on self-test.

4. The verification system according to claim 1, wherein the microcontroller is coupled to the system management bus controller by a data line, a clock line, and a ground line.

5. The verification system according to claim 1, wherein the microcontroller comprises a system management bus and a universal serial bus.

6. The verification system according to claim 1, wherein the microcontroller inputs the log file to a lookup table to generate the readable character, and the lookup table comprises a correspondence between binary data in the log file and the readable character.

7. The verification system according to claim 5, wherein the verification device receives the readable character by the universal serial bus.

8. A verification method of a basic input output system, the verification method comprising:
    determining whether to output at least one of a plurality of stage log files of a plurality of self-test stage in a log file of the basic input output system according to a code of the basic input output system by a system management bus controller in a platform controller hub of a server;
    when a first stage log file among the plurality of stage log files is to be output, clearing data in a register in the system management bus controller and inputs the first stage log file into the register by the system management bus controller;
    receiving the first stage log file and converting the first stage log file into a readable character by a microcontroller; and
    receiving and displaying the readable character by a verification device.

9. The verification method according to claim 8, wherein the system management bus controller is initialized before the log file is output, and the system management bus controller is configured to control a system management bus.

10. The verification method according to claim 9, further comprising transferring the log file by a data line and a clock line in the system management bus, wherein the log file is a test result of the basic input output system performing a power-on self-test.

11. The verification method according to claim 8, further comprising providing the microcontroller coupled to the system management bus controller by a data line, a clock line, and a ground line.

12. The verification method according to claim 8, further comprising providing the microcontroller comprising a system management bus and a universal serial bus.

13. The verification method according to claim 8, further comprising inputting the log file to a lookup table to generate the readable character, wherein the lookup table comprises a correspondence between binary data in the log file and the readable character.

14. The verification method according to claim 12, further comprising receiving the readable character by the universal serial bus.

* * * * *